July 1, 1924.
H. H. DUKE
1,499,809
DISK WHEEL FOR MOTOR AND OTHER ROAD VEHICLES
Filed Dec. 6, 1923
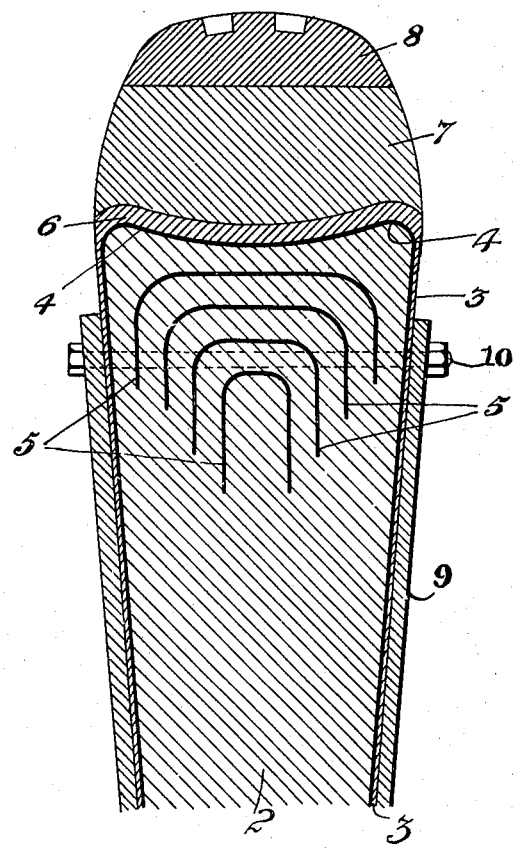
INVENTOR
Harold Hill Duke Patented July 1, 1924.

1,499,809

UNITED STATES PATENT OFFICE.

HAROLD HILL DUKE, OF ROCKDALE, SYDNEY, NEW SOUTH WALES, AUSTRALIA.

DISK WHEEL FOR MOTOR AND OTHER ROAD VEHICLES.

Application filed December 6, 1923. Serial No. 679,035.

*To all whom it may concern:*

Be it known that HAROLD HILL DUKE, a subject of the King of Great Britain and Ireland, residing at "Moseley," Banksia Avenue, Rockdale, Sydney, in the State of New South Wales, Commonwealth of Australia, has invented certain new and useful Improvements in Disk Wheels for Motor and Other Road Vehicles, of which the following is a specification.

This invention relates to solid disk wheels with integral tyres for motor and other road vehicles and refers particularly to improvements in wheels of this type as at present suggested, and the objects of this invention are—1st. To strengthen the construction of wheels of this type so that they will withstand the maximum torsional and lateral strains to which they may be subjected and 2nd. To provide at the same time a more resilient wheel which will absorb road shocks as well as an ordinary wheel fitted with a pneumatic tyre.

The improved disk wheel constructed according to this invention comprises a circular core of finely granulated cork mixed with rubber and the usual vulcanizing ingredients having a number of reinforcing bands of canvas or other suitable reinforcing material such as cord, cord netting, or wire netting embodied therein near its periphery, which is slightly concave in form, these bands extending across the core and then inwards towards the centre on each side. Round the periphery of the core a canvas binding layer is placed and over this is the tread which is formed of three layers (1) a layer of medium hard rubber immediately overlying the canvas binder, (2) a cushion layer composed of comparatively soft and resilient rubber and (3) the tread proper formed of vulcanized tread rubber in which a suitable pattern may be formed.

The core is faced on each side with a thin layer of suitable rubber to present a good appearance and the wheel is further strengthened against side thrust by a pair of hub plates bolted one to each side of the wheel.

The invention may be more readily understood by referring to the accompanying drawing which illustrates diagrammatically in section a wheel constructed according to this invention.

The core 2 is formed of fine granulated cork and rubber mixed in suitable proportions approximately 2 parts cork and 1 part rubber together with the usual well known vulcanizing ingredients and is faced with a thin layer 3 of rubber. Near the concave periphery of and within the core which is surrounded by the canvas binding layer 4 which may extend over the whole exterior of the core are a number of reinforcing bands of canvas or other suitable material 5 arranged approximately in the manner shown in the drawing. These bands may be extended any desired distance towards the centre of the wheel.

Outside the canvas binding layer 4 is formed the tread consisting of three layers 6, 7 and 8, the layer 6 being composed of rubber or rubber compound and vulcanizing ingredients of a nature to render it medium hard when cured. The layer 7 is composed of rubber or rubber compound and vulcanizing ingredients arranged to provide a relatively soft cushioning layer when vulcanized and the layer 8 is formed of tread rubber and ingredients to form a hard wear resisting tread proper in which a pattern as desired may be formed.

The wheel is attached to the hub in any well known manner and metal circular plates 9 are bolted to each side of the wheel by bolts 10 at intervals to give additional strength.

The various ingredients and materials are placed within a mould in their right order, arrangement and quantity and the whole mass pressed to the required size and vulcanized to form a homogeneous whole.

I claim:—

1. An improved solid disk wheel comprising a circular core composed of finely granulated cork and rubber, a plurality of reinforcing fabric bands within said core, a tread integral with said core and rubber side walls encasing said circular core.

2. An improved solid disk wheel as set out in claim 1 characterized in that the tread is formed in three layers (*a*) a medium hard internal layer, (*b*) a relatively soft and thick intermediate layer and (*c*) a hard tread layer, said layers being vulcanized together to form an integral tread round the periphery.

3. An improved solid disk wheel as set out in claim 1 having a plurality of flexible reinforcing strips within the core, said bands extending transversely across and inwardly towards the centre of said core.

4. An improved solid disk wheel in which the core is formed of a mixture of fine granulated cork and rubber together with vulcanizing ingredients, internal reinforcing strips in said core, said core having a concave periphery to which the tread is integrally united.

5. An improved solid disk wheel as set out in claim 1 in combination with metal reinforcing plates, one on each side of said wheel secured thereto by bolts.

6. An improved solid disk wheel as set out in claim 1 characterized in that the granulated cork and rubber are combined in the proportions of two to one and mixed with vulcanizing ingredients.

In testimony whereof he has affixed his signature in presence of two witnesses.

HAROLD HILL DUKE.

Witnesses:
T. C. ALLEN,
N. M. GODDARD.